US012559378B2

(12) United States Patent
Chen et al.

(10) Patent No.: US 12,559,378 B2
(45) Date of Patent: Feb. 24, 2026

(54) LEACHING-SEEPAGE PROCESS OF SODIUM SULFATE IN THENARDITE TAILING STACK

(71) Applicant: SC Hongya Qingyijiang Sodium Sulphate Co., Ltd., Meishan (CN)

(72) Inventors: Guangping Chen, Meishan (CN); Xiping Ni, Meishan (CN); Yaqiang Zhuo, Meishan (CN); Hongyan Tan, Meishan (CN); Nianjun Zeng, Meishan (CN)

(73) Assignee: SC Hongya Qingyijiang Sodium Sulphate Co., Ltd., Meishan (CN)

( * ) Notice: Subject to any disclaimer, the term of this patent is extended or adjusted under 35 U.S.C. 154(b) by 491 days.

(21) Appl. No.: 18/214,502

(22) Filed: Jun. 26, 2023

(65) Prior Publication Data

US 2024/0190714 A1 Jun. 13, 2024

(30) Foreign Application Priority Data

Dec. 13, 2022 (CN) .......................... 202211596026.8

(51) Int. Cl.
*C01D 5/16* (2006.01)
*E21F 17/00* (2006.01)

(52) U.S. Cl.
CPC ................ *C01D 5/16* (2013.01); *E21F 17/00* (2013.01)

(58) Field of Classification Search
CPC .................................. C01D 5/16; E21F 17/00
See application file for complete search history.

(56) References Cited

PUBLICATIONS

Kiipula, "Treatment of sulphate in mine water: recycling perspective", Master's Thesis, Aalto University School of Chemical Technology, Aug. 22, 2016, total 134 pages (Year: 2016).*
Bortnikova et al., "Chemical Treatment of Highly Toxic Acid Mine Drainage at A Gold Mining Site in Southwestern Siberia, Russia" Minerals 10, Sep. 2020, 1-22 (Year: 2020).*
Kudryashova et al., "Composition for rock grouting based on insoluble calcium salts for groundwater protection" Environmental Earth Sciences 80, Mar. 2021, 1-8 (Year: 2021).*

* cited by examiner

*Primary Examiner* — Anthony J Zimmer
*Assistant Examiner* — Abdul-Rahman Yusuf Waleed Smari
(74) *Attorney, Agent, or Firm* — CM Law LLP; Robert C. Klinger

(57) ABSTRACT

Provided is a leaching-seepage process of sodium sulfate in a thenardite tailings stack. The process includes the following steps: step 1, providing a mud reserve pit next to the thenardite tailings stack, and ditching a drainage ditch next to a bottom of the thenardite tailings stack; step 2, ditching a leaching pit on the thenardite tailings stack, injecting water, and letting the water stand to leach thenardite tailings; step 3, leaching the thenardite tailings with the water, so that a percolating fluid gradually flows out from the bottom of the thenardite tailings stack; step 4, flushing the bottom of the thenardite tailings stack with a spray gun, to mix the percolating fluid with mud to flow into the drainage ditch; and step 5, settling naturally in the mud reserve pit, and extracting a supernatant from the mud reserve pit by a water pump to obtain refined Glauber's salt water.

3 Claims, No Drawings

LEACHING-SEEPAGE PROCESS OF SODIUM SULFATE IN THENARDITE TAILING STACK

CROSS REFERENCE TO RELATED APPLICATION

This patent application claims the benefit and priority of Chinese Patent Application No. 202211596026.8, filed with the China National Intellectual Property Administration on Dec. 13, 2022, the disclosure of which is incorporated by reference herein in its entirety as part of the present application.

TECHNICAL FIELD

The present disclosure belongs to the technical field of comprehensive utilization of thenardite tailings, and in particular relates to a leaching-seepage process of sodium sulfate in a thenardite tailings stack.

BACKGROUND $Na_2SO_4$ is the main component of raw material Glauber's salt water used by anhydrous sodium sulfate production enterprises. At present, substantial tailings will be produced in the mining process of thenardite ore, and the production enterprises will stack the tailings intensively to form thenardite tailings stacks. The resource utilization rate of thenardite tailings stacks is not high in the existing enterprises. The content of sodium sulfate in thenardite tailings is not low. If the active ingredient cannot be recycled, precious resources will be wasted, and the environment will be polluted. Meanwhile, with the production of enterprises, the area of tailings stacks is getting larger and larger, which not only wastes the land used by enterprises, but also brings high disposal costs.

SUMMARY

The present disclosure aims to provide a leaching-seepage process of sodium sulfate in a thenardite tailings stack, in order to solve the existing problems of high disposal costs and low comprehensive utilization efficiency of the thenardite tailings stack.

The present disclosure adopts the following technical solution:

A leaching-seepage process of sodium sulfate in a thenardite tailings stack is provided, including the following steps:

step 1, providing a mud reserve pit next to the thenardite tailings stack, and ditching a drainage ditch next to a bottom of the thenardite tailings stack, so that a flow direction of the drainage ditch faces the mud reserve pit;

step 2, ditching a leaching pit on the thenardite tailings stack, injecting water into the leaching pit, and letting the water stand to leach thenardite tailings;

step 3, injecting the water into the leaching pit at intervals in the leaching process, and leaching the thenardite tailings with the water, so that a percolating fluid gradually flows out from the bottom of the thenardite tailings stack;

step 4, flushing the bottom of the thenardite tailings stack with a spray gun, to mix the percolating fluid flowing out from the bottom of the thenardite tailings stack with mud at the bottom of the thenardite tailings stack to flow into the drainage ditch; and step 5, allowing the percolating fluid and the mud in the drainage ditch to inflow into the mud reserve pit, settling naturally in the mud reserve pit, and extracting a supernatant from the mud reserve pit by a water pump to obtain refined Glauber's salt water.

Further, in step 2, the thenardite tailings stack is provided with a plurality of leaching pits, and a distance between adjacent leaching pits is not less than 10 m.

Further, in step 3, the water is injected into the leaching pit at an interval of 12 h in the leaching process.

In summary, owing to adopting the foregoing technical solution, the present disclosure has the following beneficial effects:

1. In the present disclosure, leaching pits are ditched on the thenardite tailings stack, and $Na_2SO_4$ in the thenardite tailings stack is dissolved to obtain the refined Glauber's salt water through a leaching-seepage process. This process not only makes full use of thenardite tailings resources, but also substantially reduces the floor space of the thenardite tailings stack, lowers enterprise's disposal costs, becomes more environmentally friendly, and turns waste into wealth. The present disclosure solves the existing problems of high disposal costs and low comprehensive utilization efficiency of the thenardite tailings stack.

DETAILED DESCRIPTION OF THE EMBODIMENTS

In order to make the objective, technical solution, and advantages of the present disclosure clearer, the present disclosure will be further described in detail below in conjunction with examples. It should be understood that the specific examples described herein are merely intended to explain the present disclosure, but not to limit the present disclosure.

A leaching-seepage process of sodium sulfate in a thenardite tailings stack is provided, including the following steps:

step 1, providing a mud reserve pit next to the thenardite tailings stack, and ditching a drainage ditch next to a bottom of the thenardite tailings stack, so that a flow direction of the drainage ditch faces the mud reserve pit;

step 2, ditching a leaching pit on the thenardite tailings stack, injecting water into the leaching pit, and letting the water stand to leach thenardite tailings;

step 3, injecting the water into the leaching pit at intervals in the leaching process, and leaching the thenardite tailings with the water, so that a percolating fluid gradually flows out from the bottom of the thenardite tailings stack;

step 4, flushing the bottom of the thenardite tailings stack with a spray gun, to mix the percolating fluid flowing out from the bottom of the thenardite tailings stack with mud at the bottom of the thenardite tailings stack to flow into the drainage ditch; and step 5, allowing the percolating fluid and the mud in the drainage ditch to inflow into the mud reserve pit, settling naturally in the mud reserve pit, and extracting a supernatant from the mud reserve pit by a water pump to obtain refined Glauber's salt water.

Further, in step 2, the thenardite tailings stack is provided with a plurality of leaching pits, and a distance between adjacent leaching pits is not less than 10 m.

Further, in step 3, the water is injected into the leaching pit at an interval of 12 h in the leaching process.

During the implementation of the present disclosure, leaching pits are ditched on the thenardite tailings stack, and $Na_2SO_4$ in the thenardite tailings stack is dissolved to obtain the refined Glauber's salt water through a leaching-seepage process. This process not only makes full use of thenardite tailings resources, but also substantially reduces the floor space of the thenardite tailings stack, lowers enterprise's disposal costs, becomes more environmentally friendly, and turns waste into wealth. The present disclosure solves the existing problems of high disposal costs and low comprehensive utilization efficiency of the thenardite tailings stack.

Example 1

A leaching-seepage process of sodium sulfate in a thenardite tailings stack was provided, including the following steps:

step 1, a mud reserve pit was provided next to the thenardite tailings stack, and a drainage ditch was ditched next to a bottom of the thenardite tailings stack, so that a flow direction of the drainage ditch faced the mud reserve pit;

step 2, leaching pits were ditched on the thenardite tailings stack, and water was injected into the leaching pits and let stand to leach thenardite tailings;

step 3, the water was injected into the leaching pits at intervals in the leaching process, and the thenardite tailings were leached with the water, so that a percolating fluid gradually flowing out from the bottom of the thenardite tailings stack;

step 4, the bottom of the thenardite tailings stack was flushed with a spray gun to mix the percolating fluid flowing out from the bottom of the thenardite tailings stack with mud at the bottom of the thenardite tailings stack to flow into the drainage ditch; and step 5, the percolating fluid and the mud in the drainage ditch were allowed to inflow into the mud reserve pit and settled naturally in the mud reserve pit, and a supernatant was extracted from the mud reserve pit by a water pump to obtain refined Glauber's salt water.

Example 2

A leaching-seepage process of sodium sulfate in a thenardite tailings stack was provided, including the following steps:

step 1, a mud reserve pit was provided next to the thenardite tailings stack, and a drainage ditch was ditched next to a bottom of the thenardite tailings stack, so that a flow direction of the drainage ditch faced the mud reserve pit;

step 2, leaching pits were ditched on the thenardite tailings stack, and water was injected into the leaching pits and let stand to leach thenardite tailings; the thenardite tailings stack was provided with a plurality of the leaching pits, and a distance between adjacent leaching pits was not less than 10 m;

step 3, the water was injected into the leaching pits at intervals in the leaching process, and the thenardite tailings were leached with the water, so that a percolating fluid gradually flowing out from the bottom of the thenardite tailings stack;

step 4, the bottom of the thenardite tailings stack was flushed with a spray gun to mix the percolating fluid flowing out from the bottom of the thenardite tailings stack with mud at the bottom of the thenardite tailings stack to flow into the drainage ditch; and step 5, the percolating fluid and the mud in the drainage ditch were allowed to inflow into the mud reserve pit and settled naturally in the mud reserve pit, and a supernatant was extracted from the mud reserve pit by a water pump to obtain refined Glauber's salt water.

Example 3

A leaching-seepage process of sodium sulfate in a thenardite tailings stack was provided, including the following steps:

step 1, a mud reserve pit was provided next to the thenardite tailings stack, and a drainage ditch was ditched next to a bottom of the thenardite tailings stack, so that a flow direction of the drainage ditch faced the mud reserve pit;

step 2, leaching pits were ditched on the thenardite tailings stack, and water was injected into the leaching pits and let stand to leach thenardite tailings;

step 3, the water was injected into the leaching pits at intervals in the leaching process, and the thenardite tailings were leached with the water, so that a percolating fluid gradually flowing out from the bottom of the thenardite tailings stack; the water was injected into the leaching pits at an interval of 12 h in the leaching process;

step 4, the bottom of the thenardite tailings stack was flushed with a spray gun to mix the percolating fluid flowing out from the bottom of the thenardite tailings stack with mud at the bottom of the thenardite tailings stack to flow into the drainage ditch; and step 5, the percolating fluid and the mud in the drainage ditch were allowed to inflow into the mud reserve pit and settled naturally in the mud reserve pit, and a supernatant was extracted from the mud reserve pit by a water pump to obtain refined Glauber's salt water.

Example 4

A leaching-seepage process of sodium sulfate in a thenardite tailings stack was provided, including the following steps:

step 1, a mud reserve pit was provided next to the thenardite tailings stack, and a drainage ditch was ditched next to a bottom of the thenardite tailings stack, so that a flow direction of the drainage ditch faced the mud reserve pit;

step 2, leaching pits were ditched on the thenardite tailings stack, and water was injected into the leaching pits and let stand to leach thenardite tailings; the thenardite tailings stack was provided with a plurality of the leaching pits, and a distance between adjacent leaching pits was not less than 10 m;

step 3, the water was injected into the leaching pits at intervals in the leaching process, and the thenardite tailings were leached with the water, so that a percolating fluid gradually flowing out from the bottom of the thenardite tailings stack; the water was injected into the leaching pits at an interval of 12 h in the leaching process;

step 4, the bottom of the thenardite tailings stack was flushed with a spray gun to mix the percolating fluid flowing out from the bottom of the thenardite tailings stack with mud at the bottom of the thenardite tailings stack to flow into the drainage ditch; and step 5, the percolating fluid and the mud in the drainage ditch were allowed to inflow into the mud reserve pit and settled naturally in the mud reserve pit, and a supernatant was extracted from the mud reserve pit by a water pump to obtain refined Glauber's salt water.

The above descriptions are only preferred examples of the present disclosure and are not intended to limit the present disclosure. Any modifications, equivalent substitutions and improvements made within the spirit and principles of the present disclosure shall be included in the protection scope of the present disclosure.

What is claimed is:

1. A leaching-seepage process of sodium sulfate in a thenardite tailings stack, comprising the following steps:

step 1, providing a mud reserve pit next to the thenardite tailings stack, and ditching a drainage ditch next to a bottom of the thenardite tailings stack, so that a flow direction of the drainage ditch faces the mud reserve pit;

step 2, ditching a leaching pit on the thenardite tailings stack, injecting water into the leaching pit, and letting the water stand to leach thenardite tailings;

step 3, injecting the water into the leaching pit at intervals in the leaching process, and leaching the thenardite tailings with the water, so that a percolating fluid gradually flows out from the bottom of the thenardite tailings stack;

step 4, flushing the bottom of the thenardite tailings stack with a spray gun, to mix the percolating fluid flowing out from the bottom of the thenardite tailings stack with mud at the bottom of the thenardite tailings stack to flow into the drainage ditch; and step 5, allowing the percolating fluid and the mud in the drainage ditch to inflow into the mud reserve pit, settling naturally in the mud reserve pit, and extracting a supernatant from the mud reserve pit by a water pump to obtain refined Glauber's salt water.

2. The leaching-seepage process of sodium sulfate in a thenardite tailings stack according to claim 1, wherein in step 2, the thenardite tailings stack is provided with a plurality of leaching pits, and a distance between adjacent leaching pits is not less than 10 m.

3. The leaching-seepage process of sodium sulfate in a thenardite tailings stack according to claim 1, wherein in step 3, the water is injected into the leaching pit at an interval of 12 h in the leaching process.

* * * * *